United States Patent [19]

Park

[11] Patent Number: 4,899,480
[45] Date of Patent: Feb. 13, 1990

[54] FISHING PROBE APPARATUS

[76] Inventor: Michael C. Park, 5945 SW. Arrowwood La., Portland, Oreg. 97225

[21] Appl. No.: 221,264

[22] Filed: Jul. 19, 1988

[51] Int. Cl.⁴ .................. A01K 31/06; A01K 89/00
[52] U.S. Cl. ................................. 43/4; 374/136
[58] Field of Search .............. 43/4, 4.5; 242/106; 374/136, 142, 143; 73/290 R, 291, 268; 356/43

[56] References Cited

U.S. PATENT DOCUMENTS

| | | | |
|---|---|---|---|
| 3,087,338 | 4/1963 | Horbinski et al. | 374/136 |
| 3,628,274 | 12/1971 | Wojahn | 43/4 |
| 3,721,124 | 3/1973 | Franks | 374/136 |
| 3,785,079 | 1/1974 | Rohn | 43/4 |
| 3,808,731 | 5/1974 | Lowrance | 43/4 |
| 3,922,808 | 12/1975 | Rieth et al. | 43/4 |
| 4,050,180 | 9/1977 | King | 43/4 |
| 4,462,699 | 7/1984 | Shaw et al. | 356/43 |
| 4,523,092 | 6/1985 | Nelson | 374/143 |
| 4,713,967 | 12/1987 | Overs et al. | 374/136 |
| 4,752,141 | 6/1988 | Sun et al. | 374/142 |

Primary Examiner—Kurt Rowan
Attorney, Agent, or Firm—Dellett, Smith-Hill & Bedell

[57] ABSTRACT

A fishing probe apparatus comprises an immersible probe attached to the end of an optic fiber fishing line which carries optic signals transmitted by the probe to a receiver and display unit on the fishing pole. The probe transmits data pertaining to aquatic conditions in the vicinity of a leader and hook attached to the probe.

15 Claims, 4 Drawing Sheets

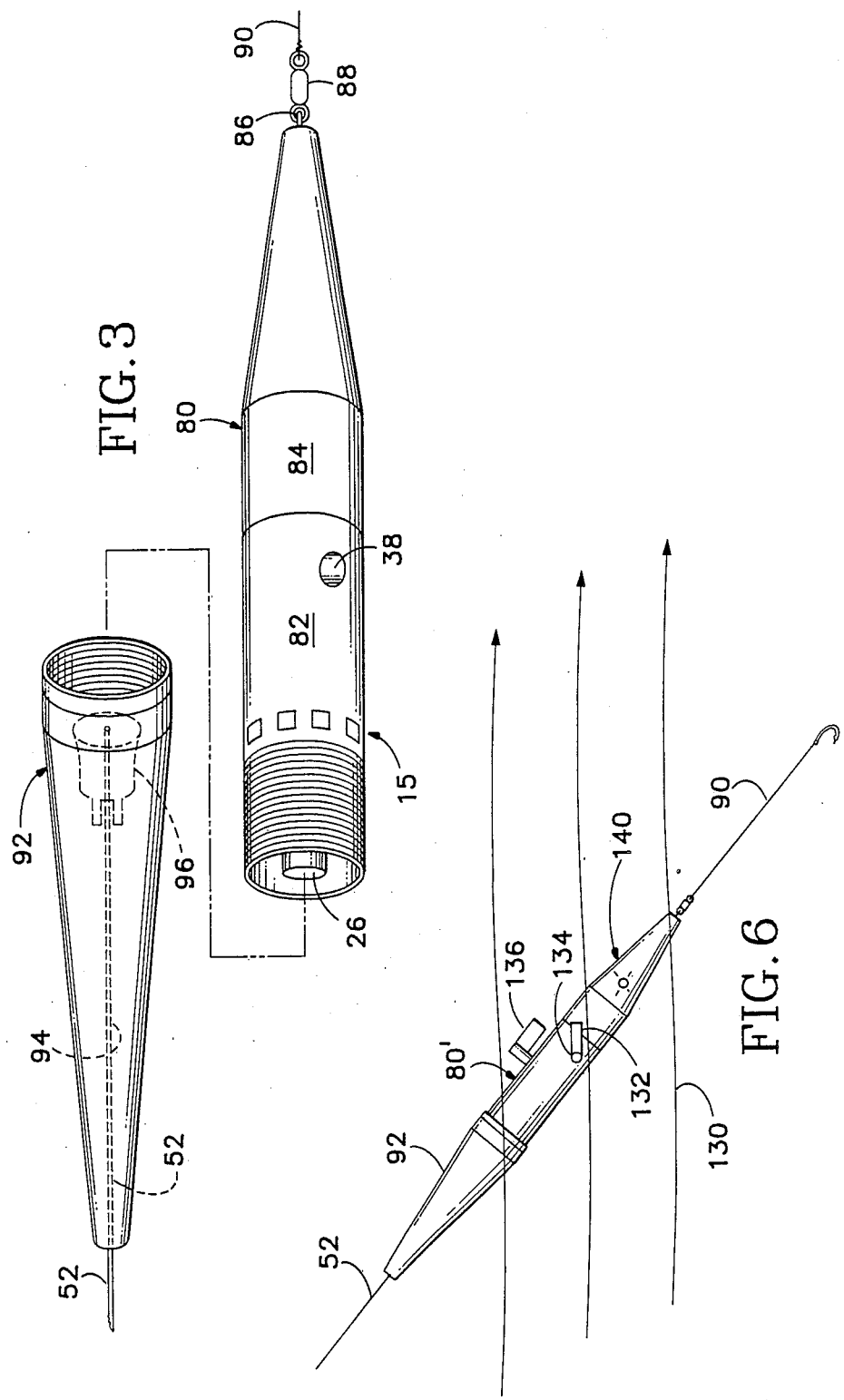

FISHING PROBE APPARATUS

BACKGROUND OF THE INVENTION

This invention relates to probe apparatus for measuring aquatic conditions pertinent to fishing activities and for controlling the condition of the apparatus.

It is known that certain aquatic conditions are favored by fish species and that by locating the existence of said conditions in a body of water a person fishing for such species is more likely to succeed. Aquatic conditions considered pertinent to fishing activities include lighting conditions, such as the amount and spectrum of ambient light, and water characteristics such as temperature, salinity, pH level, velocity, and oxygen content. Measurement of aquatic conditions has been performed utilizing an immersible probe; however, it is not always possible to position the probe near the fishing hook or lure to obtain an accurate picture of the conditions at the hook or lure. It has been proposed, e.g. in U.S. Pat. No. 4,349,976, to combine a fishing lure and a pH sensing probe apparatus in order to locate the lure at the site of measurement. In this system the lure/probe depends from a flexible element which includes a cable for physically supporting the device and a cable for conducting electrical signals generated by the probe. While it is desirable to position the probe adjacent to the fishing lure or hook, it is undesirable to suspend the lure from such a twin cable assembly as such an assembly does not operate with a conventional fishing reel. Depth measuring devices, of the type described in Time magazine, June 6, 1988, page 62, have been used to measure the distance from the water surface to the bottom of a body of water or to a school of fish, but no device is known which indicates the depth of a fishing hook or lure. While it is possible to measure the amount of fishing line extending from a fishing reel, this measurement does not accurately reflect the depth of the hook, as the line does not always hang vertically in the water.

SUMMARY OF THE INVENTION

A preferred embodiment of the present invention in its first aspect is a sensor responsive to aquatic conditions and means for introducing an optic signal representative of the aquatic condition into a first end of an optic fiber such that sensor data may be retrieved from a second end of the fiber by a receiver and display device.

A preferred embodiment of the present invention in its second aspect is a sensor responsive to aquatic conditions and means for introducing an optic signal representative of the aquatic condition into a first end of an optic fiber which serves as a fishing line such that a second end of the optic fiber may be coupled to a receiver mounted upon a fishing pole.

BRIEF DESCRIPTION OF THE DRAWINGS

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

FIG. 3 shows a water-tight casing for the immersible probe diagrammed in FIG. 1 and a connector for coupling the probe to an optic fiber fishing line;

FIG. 6 shows an active immersible probe which receives commands by way of an optic fiber fishing line.

DETAILED DESCRIPTION

Figure 1:
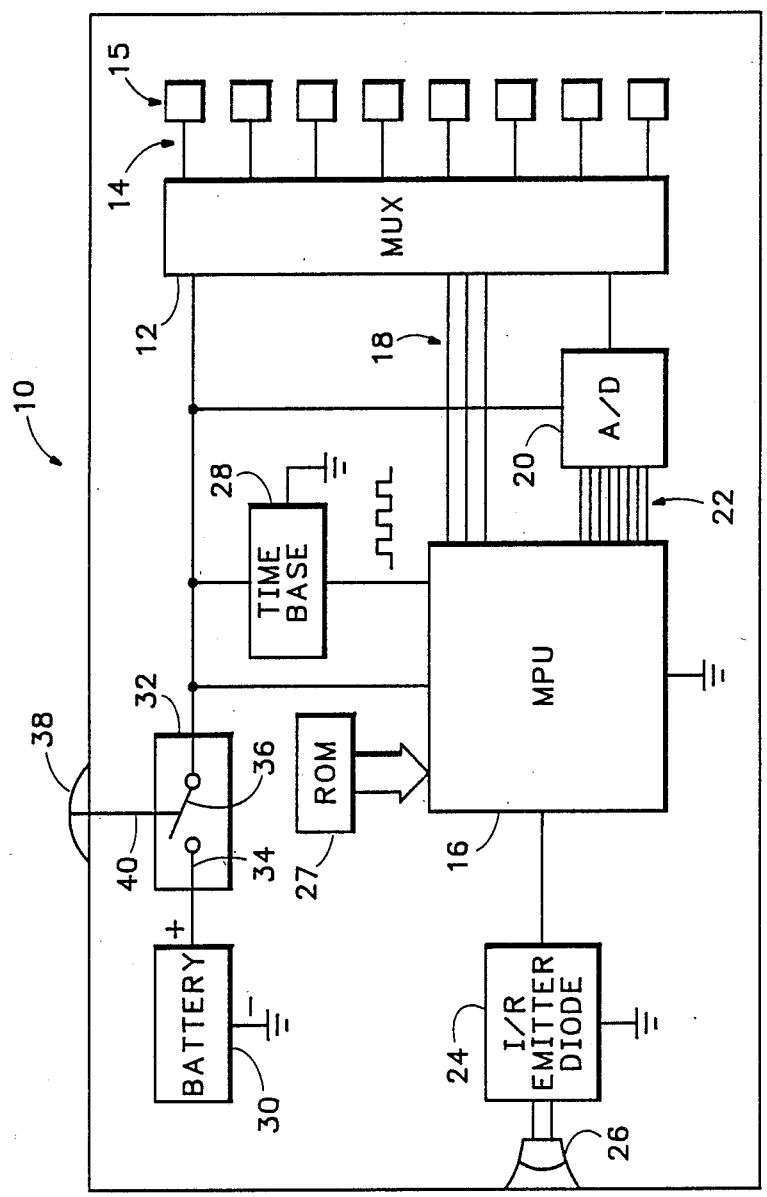
FIG. 1 is a block diagram of control circuitry for an immersible probe adapted to emit data via an optic fiber fishing line.
Figure 2:
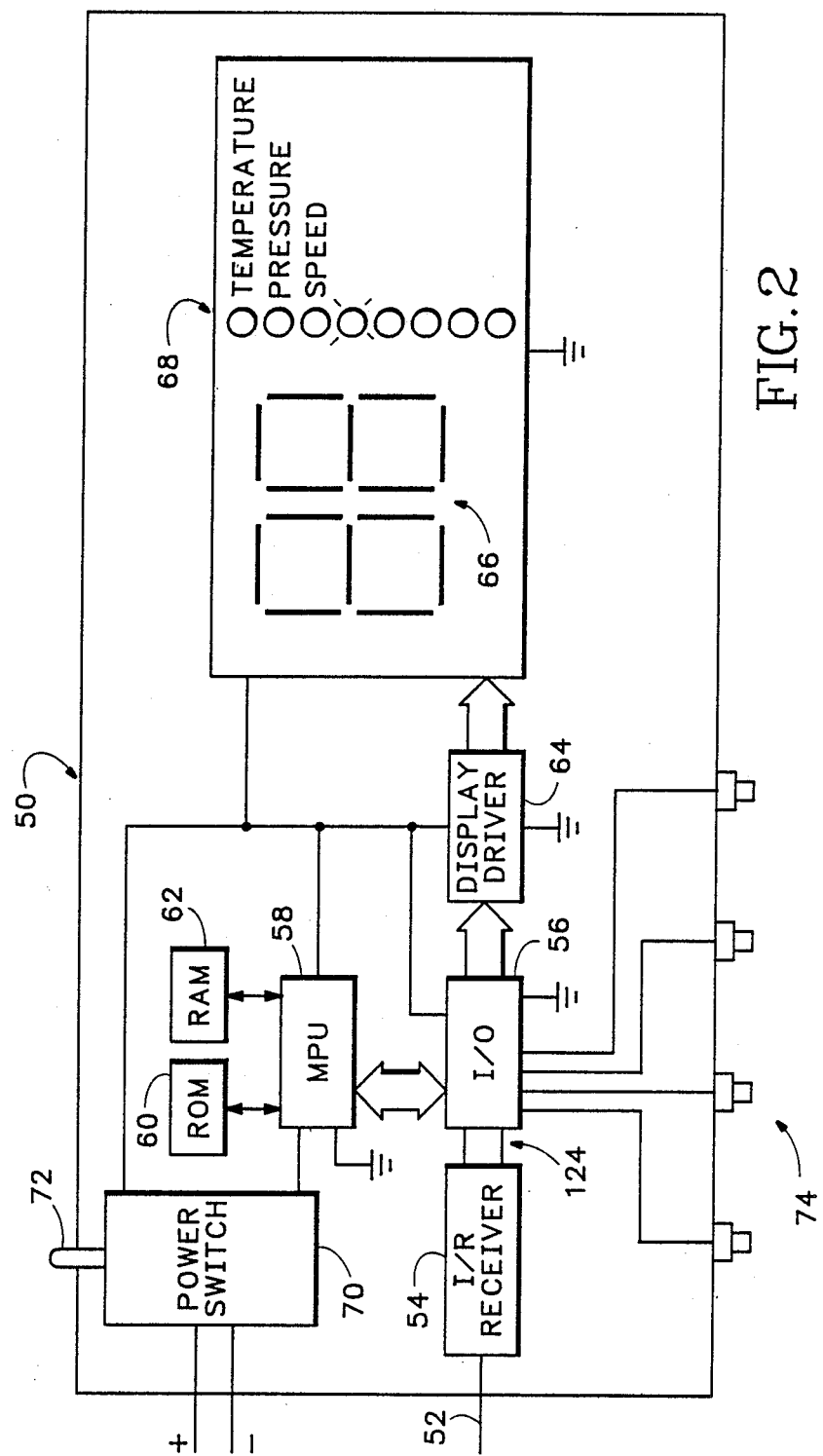
FIG. 2 is a block diagram of a receiver and display unit which receives data from the probe circuitry diagrammed in FIG. 1.

FIGS. 1-3 illustrate fishing probe apparatus comprising an immersible probe which may be attached to the end of an optic fiber fishing line which carries optic signals transmitted by the probe apparatus to a receiver and display unit on a fishing pole. The term "optic fiber fishing line" refers to a flexible elongate element capable of conducting optic signals and performing the function of a conventional fishing line when used with fishing tackle. The probe apparatus transmits data pertaining to aquatic conditions in the vicinity of a leader and hook attached to the probe.

FIG. 1 is a block diagram of control circuitry 10 for the fishing probe apparatus. A set of aquatic sensor 15 provide analog signals representative of aquatic conditions to a multiplexer 12 via electrical leads 14. The number and type of sensors 15 utilized depends on the particular aquatic conditions considered pertinent. As used herein and in the claims attached hereto, the term "aquatic condition" refers to any measurable condition existing within a body of water including, but not limited to, light conditions and water characteristics. Sensors 15 operate according to well known physical principles and suitably include devices for measurement of temperature, probe depth in a body of water, tensile stress on the optic fiber fishing line, probe speed relative to a body of water surrounding the probe apparatus, pH level, acoustic noise, salinity, depth to bottom of a body of water from probe, light conditions at various wavelengths and electric field present. A micro processor unit 16 drives address lines 18 of multiplexer 12 to select one of the analog signals present on leads 14 for switching through multiplexer 12 to an analog-to-digital converter 20. Analog-to-digital converter 20 provides its digital output at data lines 22 to processor 16. Processor 16 selects and samples signals present on leads 14 by presenting an address to multiplexer 12 and, after a suitable time delay, reading the digital output provided by analog-to-digital converter 20. Processor 16 drives an infrared emitter diode 24 which is optically coupled to the exterior of the probe through an optical coupler 26 adapted for coupling to an optic fiber fishing line as described hereinafter.

ROM 27 stores a program directing processor 16 to cycle through multiplexer address combinations, obtain data from each sensor and compose data packets representing current sensor 15 measurements. The size of each data packet depends on the resolution of data representation. The number of data packets required depends on the number of sensors 15 from which data is taken. In the preferred embodiment, each sensor measurement is stored in one byte and each data packet comprises two bytes; one byte identifying the sensor from which the data is taken and one byte to store the sensor data. The data packets are collected intermittently and emitted from the probe via emitter diode 24 and coupler 26 in a manner similar to serial RS-232 protocol wherein the presence of light in the fiber corresponds to one RS-232 voltage, e.g. bit=1, and no light in the fiber corresponds to another RS-232 voltage, e.g. bit=0. Thus, each packet is transmitted as two consecutive bytes with each byte proceeded by a start bit and followed by a stop bit in the usual RS-232 fashion. Time base 28 establishes a predetermined baud rate for the serial emission. In the preferred embodiment, sensor data is collected intermittently, but a data packet pertaining to a given sensor is prepared and emitted only after the sensor data changes with respect to the last emission so as to minimize the use of emitter diode 24 and thereby reduce power consumption. In this manner, sensor data taken from leads 14 is provided in an optic signal emitted by the probes. By sampling the optic signal at the predetermined baud rate, data representative of each measured aquatic condition may be collected for display.

Battery 30 is coupled through pressure switch 32 to power processor 16, time base circuit 28, analog-to-digital converter 20 and multiplexer 12. Switch 32 includes a stationary contact 34 attached to the positive lead of battery 30 and a movable contact 36 connected to the components of control circuit 10. A membrane 38 on the exterior of the probe is mechanically connected by slidable rod 40 to contact 36. When the probe is immersed in a body of water, water pressure pushes against membrane 38 and closes switch 32 to automatically turn on the probe. The probe then begins to emit an optic signal representative of aquatic conditions in the vicinity of the probe. A receiver and display unit 50, shown in FIG. 2, receives the optic signal and displays information pertaining to the measured aquatic conditions.

Referring now to FIG. 2, receiver and display unit 50 is optically coupled at infrared receiver 54 to an optic fiber fishing line 52. Receiver 54 provides an electrical signal, corresponding to the optical signal taken from line 52, on leads 124 to input/output circuit 56. Processor 58 couples to input/output circuit 56 to collect the data taken from line 52. Processor 58 utilizes ROM memory 60 for program storage and RAM memory 62 for data storage. Processor 58 monitors incoming data packets from line 52, separates the data and stores each measured aquatic condition in memory 62. Processor 58 updates memory 62 to contain the most current sensor information as each packet arrives. Processor 58 couples to display driver 64 through input/output circuit 56. Display driver 64 operates a pair of seven segment displays 66 and a set of LEDS each labeled with one of the measured aquatic conditions. When the value of a measured aquatic condition appears on seven segment displays 66, the corresponding LED 68 lights to identify the measurement displayed.

Unit 50 is powered by a battery (not shown) via power switch 70 having a manually operated toggle 72 for turning unit 50 on. (The battery could be secured within a fishing pole handle or within unit 50.) External control switches 74 couple to processor 58 through input/output circuit 56 and permit user input for controlling operation of unit 50.

In operation, receiver and display unit 50 is turned on and placed in one of several modes by operation of external switches 74. In one mode, all measured aquatic conditions are displayed sequentially with enough time between displays for the user to read the display. In a second mode, the user selects one measurement for constant display. In other modes, unit 50 locks on to several selected aquatic conditions and sequentially displays values for the selected conditions. Many other mode configurations are possible by suitably programming processor 58.

FIG. 3 illustrates a water-tight probe casing 80 for control circuit 10 of FIG. 1. Optic coupler 26 mounts centrally at a threaded end of probe casing 80. Casing 80 includes a compartment 82 for housing control circuitry 10 and aquatic sensors 15 while compartment 84 stores battery 30. Membrane 38 of pressure switch 32 (FIG. 1) forms a portion of casing 80 and responds to differences in pressure on each side of casing 80. Sensors 15 mount to casing 80 for sensing aquatic conditions in the vicinity of the probe. An eye 86, affixed to the end of casing 80 opposite coupler 26, carries a swivel 88 and leader 90 to which a hook or lure (not shown) may be attached.

Optic fiber fishing line 52 is secured by adhesive within bore 94 of connector 92 and centrally positioned at a threaded end of connector 92. The threaded ends of connector 92 and casing 80 are threadably joined such that optic signals emitted by emitter 24 (FIG. 1) are provided by way of coupler 26 to line 52. In this manner, line 52 is optically coupled to the probe and optic signals generated by the probe are received by receiver and display unit 50 (FIG. 2) for processing and display.

Figure 5:
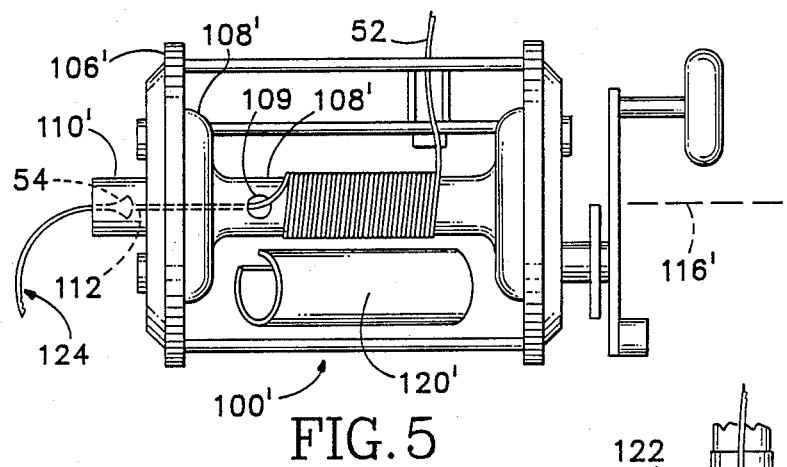
FIG. 5 illustrates a method of coupling an optic signal through a deep sea reel.
Figure 4:
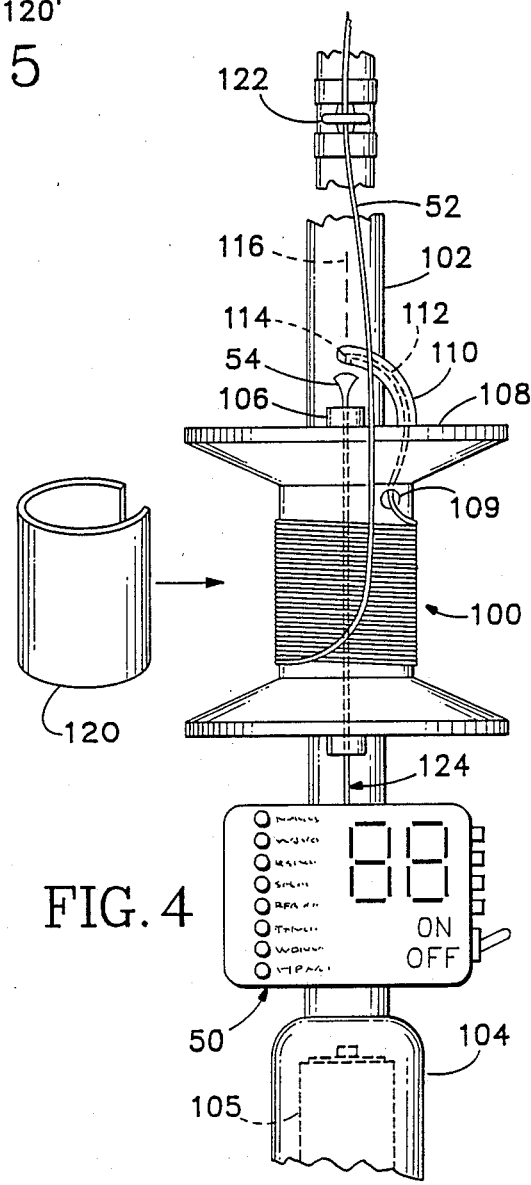
FIG. 4 illustrates a method of coupling an optic signal through a spinning reel.

FIGS. 4 and 5 show portions of fishing reels and illustrate optical coupling through a fishing reel such that optic fiber fishing line 52 may be wrapped around the reel yet maintain an optical connection with receiver and display unit 50. The objective is to establish an optical rotary coupling between an element on the rotating portion of the reel and an element on the stationary portion. In FIG. 4, spinning reel 100, of which only portions are shown, mounts to fishing pole 102 in the usual fashion while receiver and display unit 50 attaches to pole 102 between fishing pole handle 104 and reel 100. Handle 104 contains a battery 105 for powering unit 50. Reel 100 includes a stationary portion 106 and a rotary portion 108. Arm 110 mounts to rotary portion 108 of reel 100 and includes a central passage 112 terminating in a straight section 114 along the central rotational axis 116 of rotary portion 108. Optic fiber fishing line 52 is inserted through hole 109 in portion 108 and through passage 112, and positioned to terminate at the opening of straight section 116. Line 52 may not be tied to rotary portion 108 as this would inhibit the optical transmission properties of line 52. Thus, line 52 is wrapped around rotary portion 108 and C-clip 120 is attached to portion 108 to firmly secure line 52 thereon. The distal portion of line 52 feeds through the eyes 122 of pole 102 in the usual fashion. Infrared receiver 54 mounts to stationary portion 106 adjacent to straight portion 114 of passage 112 for optical coupling to line 52. Electrical conductors 124 couple receiver 54 to receiver and display unit 50.

A second method of rotary coupling for deep sea reel 100' is shown in FIG. 5 wherein block 110' mounts to stationary portion 106' and includes a straight passage 112' coaxial with rotational axis 116'. Line 52 is inserted through hole 109 in rotary portion 108' and through passage 112' in block 110' for axial alignment with axis 116'. Line 52 thereby rotates with rotary portion 108' while being held centrally along axis 116'. Clip 120' secures line 52 to portion 108' as in the case of FIG. 4. Receiver 54 mounts to block 110' adjacent to the end of line 52 for optical coupling thereto.

FIG. 6 illustrates an application of the present invention wherein an optic fiber fishing line 52 delivers commands to affect the condition of an active probe 80'. In a preferred usage, probe 80' is either held stationary in a body of moving water or trolled through a stationary body of water, in either case active probe 80' depends from optic fiber fishing line 52 in a current, indicated by lines 130, moving relative to the probe. Active probe 80' includes lateral fins 132 mounted upon rod 134 lying transverse to probe 80' and current 130. For a given angular position of rod 134, fins 132 and current 130 interact such that probe 80' reaches an equilibrium vertical position. Rotation of rod 134 affects the interaction of fins 132 and current 130 for vertical positioning of probe 80'. Stationary fin 136 is mounted upon probe 80' in a longitudinal orientation and serves to stabilize rod 134 in a substantially horizontal position. Probe 80' is adapted to interpret positioning commands arriving by optical signal via line 52 and actuate rod 134 accordingly. It is understood that additional fins may be employed to provide lateral positioning of probe 80'.

Probe 80' also includes a light emitting device 140 responsive to commands delivered by way of line 52. Device 140 may be actuated to flash or remain on to attract fish to probe 80'.

The life of battery 30 may be extended if it is not used to power diode 24. Diode 24 may be powered by a capacitor which receives a charge by way of light energy delivered to probe 80 by way of line 52.

While a preferred embodiment of the present invention has been shown and described, it will be appreciated that many changes and modifications may be made without departing from the invention in its broader aspects. For example, the present invention encompasses a system wherein optic signals are transmitted through an optic fiber fishing line to the probe and the probe includes a modulation device for modulating the optical signal in accordance with an aquatic condition. Following modulation, the signal is reflected back up the optic fiber fishing line to a receiver unit which derives a measurement value based on the degree of modulation present in the reflected signal.

I claim:

1. A probe apparatus comprising:
    an optic fiber having a first end and a second end;
    sensor means responsive to a given aquatic condition, said sensor means including means responsive to the given aquatic condition for generating an electrical signal representative of the given aquatic condition;
    means responsive to said sensor means for converting said electrical signal into an optic signal and introducing the optic signal into the first end of said optic fiber, the optic signal being representative of the given aquatic condition; and
    means optically coupled to the second end of said optic fiber for receiving the optic signal.

2. A probe apparatus according to claim 1 wherein said optic fiber is an optic fiber fishing line and said probe apparatus further comprises a reel, said reel comprising:
    a stationary portion;
    a rotary portion adapted to rotate about a central axis relative to said stationary portion and having a length portion of said optic fiber fishing line wound thereabout; and
    means for rotating said rotary portion for controlling the amount of said optic fiber fishing line extending from said reel.

3. A probe apparatus according to claim 1 wherein said probe apparatus further comprises means responsive to an optic signal delivered to said probe apparatus by way of said optic fiber for influencing the condition of said probe apparatus.

4. A probe apparatus comprising:
    an optic fiber having a first end and a second end;
    sensor means responsive to a given aquatic condition;
    means responsive to said sensor means for introducing an optic signal into the first end of said optic fiber, the optic signal being representative of the given aquatic condition;
    means optically coupled to the second end of said optic fiber for receiving the optic signal; and
    means responsive to an optic signal delivered to said probe apparatus by way of said optic fiber for influencing the condition of said probe apparatus, said influencing means comprising fin means interactive with a body of fluid moving relative to said probe apparatus and means for actuating said fin means in accordance with said optic signal delivered to said probe apparatus to affect the position of said probe apparatus in said body of fluid.

5. A probe apparatus comprising:
    an optic fiber having a first end and a second end;
    sensor means responsive to a given aquatic condition;
    means responsive to said sensor means for introducing an optic signal into the first end of said optic fiber, the optic signal being representative of the given aquatic condition;
    means optically coupled to the second end of said optic fiber for receiving the optic signal; and
    means responsive to an optic signal delivered to said probe apparatus by way of said optic fiber for influencing the condition of said probe apparatus, said influencing means comprising a light emitting device for attracting fish to said probe apparatus.

6. A probe apparatus comprising:
    sensor means for immersion in a body of water to measure at least one aquatic condition and generate a signal representative thereof;
    an optic fiber fishing line, having a first end and a second end;
    source means coupled to said sensor means and to said first end of said optic fiber fishing line and adapted to introduce an optic signal into the optic fiber fishing line in response to the signal generated by the sensor means;
    receiver means optically coupled to the second end of said optic fiber fishing line for receiving the optic signal introduced by said source means;
    reel means including a stationary portion and a rotary portion, the rotary portion having a length portion of said optic fiber fishing line wound thereabout and the rotary portion being adapted to rotate relative to the stationary portion about a central axis, for controlling the length of optic fiber fishing line extending from said reel means to the first end of said optic fiber fishing line; and
    means for holding said second end of said optic fiber fishing line stationary with respect to the rotary portion.

7. A probe apparatus comprising:

sensor means for immersion in a body of water to measure at least one aquatic condition and generate an belectrical signal representative thereof;

an optic fiber, having a first end and a second end;

source means coupled to said sensor means and to said first end of said optic fiber and adapted to introduce an optic signal into the fiber in response to the electrical signal generated by the sensor means, said source means including means for converting said electrical signal into said optical signal for introduction into said optic fiber; and receiver means optically coupled to the second end of said optic fiber for receiving the optic signal introduced by said source means.

8. A probe apparatus according to claim 7 wherein said sensor means is responsive to at least one of the following conditions:

temperature, probe depth in a body of fluid, tensile stress on said optic fiber, acoustic noise, electric field, salinity, pH level, ambient light, and fluid velocity relative to said probe.

9. A probe apparatus according to claim 7 wherein said probe apparatus further comprises:

means for attaching a swivel to said probe.

10. A probe apparatus according to claim 7 wherein said optic fiber is an optic fiber fishing line and said probe apparatus further comprises:

reel means including a stationary portion and a rotary portion, the rotary portion having a length portion of said optic fiber fishing line wound thereabout and adapted to rotate relative to the stationary portion about a central axis, for controlling the length of optic fiber fishing line extending from said reel means to the first end of said optic fiber fishing line.

11. A probe apparatus according to claim 7 wherein said probe further comprises display means and said receiver means is responsive to the optic signal and drives said display means in a manner representative of measured aquatic conditions.

12. A probe apparatus according to claim 6 wherein the optic fiber fishing line has an end portion that terminates in said second end and which has a longitudinal axis, said receiver means is mounted upon the stationary portion of the reel means, and the end portion of said optic fiber fishing line is coaxial with the rotary portion of said reel means and rotates therewith.

13. A fishing apparatus comprising:

a reel having a stationary portion, and also having a rotary portion rotationally mounted upon said stationary portion and having a central rotational axis;

a length of optic fiber fishing line having a first end and a second end and adapted to transmit optic signals between said first and said second end, the length of optic fiber fishing line being wound around the rotary portion of said reel such that rotation of the rotary portion controls the amount of said length of optic fiber fishing line extending from said reel;

means for holding said second end of said optic fiber fishing line substantially stationary with respect to the rotary portion of said reel;

probe means for immersion in a body of water to measure an aquatic condition, said probe means being optically coupled to the first end of said optic fiber fishing line for introducing an optic signal representative of said aquatic condition into the optic fiber fishing line; and receiver means optically coupled to the second end of said length of optic fiber fishing line.

14. A fishing apparatus according to claim 13 wherein the optic fiber fishing line has an end portion that terminates in said second end and which has a longitudinal axis coincident with said central rotational axis, and wherein said receiver means is mounted upon the stationary portion.

15. A fishing apparatus according to claim 13 wherein said probe means includes means for attaching a swivel thereon.

* * * * *